Figure 1:
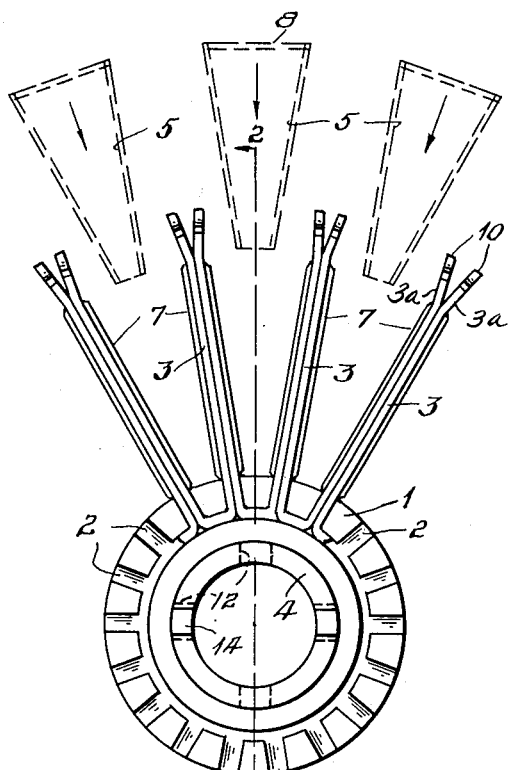

Feb. 7, 1956 L. W. PARKER 2,734,140
AXIAL AIRGAP MOTORS AND GENERATORS
Filed Feb. 1, 1952 3 Sheets-Sheet 1

INVENTOR
Louis W. Parker

Feb. 7, 1956 L. W. PARKER 2,734,140
AXIAL AIRGAP MOTORS AND GENERATORS
Filed Feb. 1, 1952 3 Sheets-Sheet 2

INVENTOR
Louis W. Parker

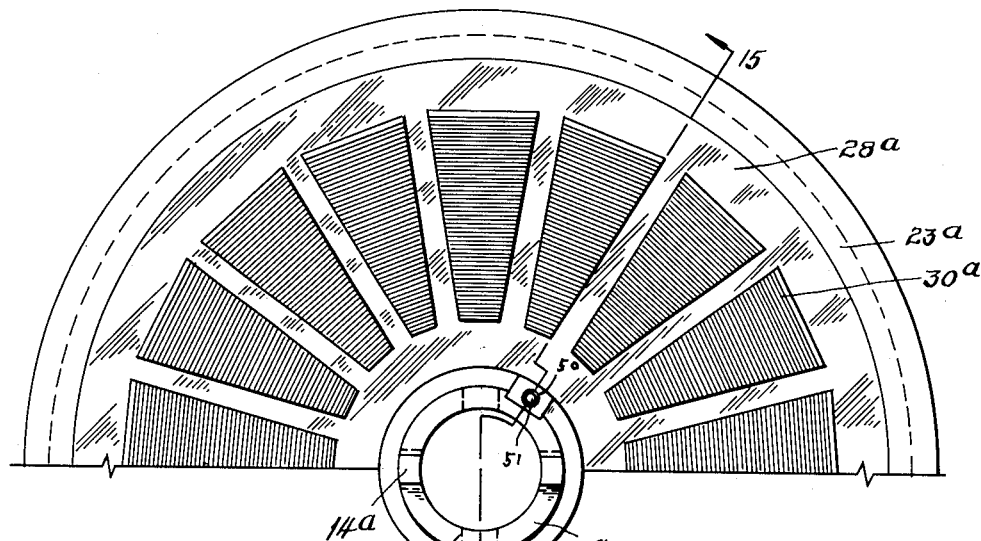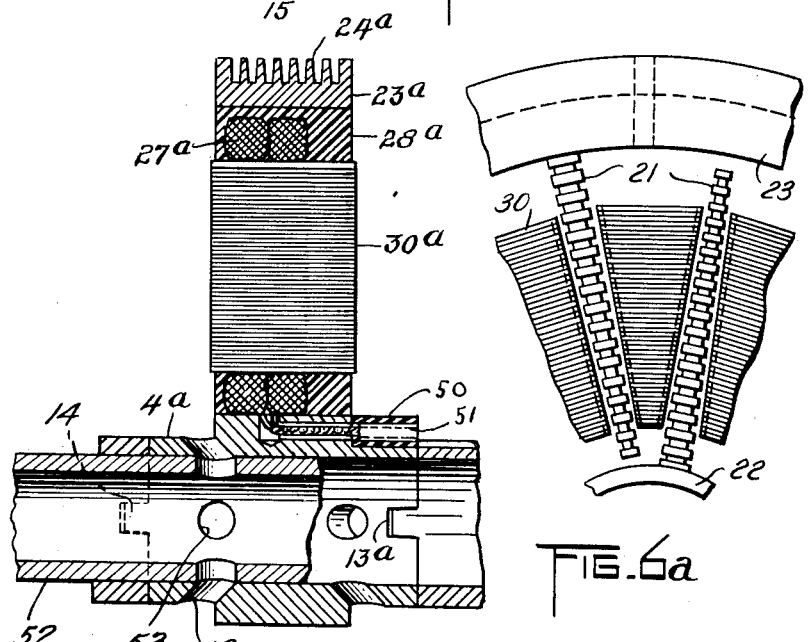

United States Patent Office 2,734,140
Patented Feb. 7, 1956

2,734,140

AXIAL AIRGAP MOTORS AND GENERATORS

Louis W. Parker, Great Neck, N. Y.

Application February 1, 1952, Serial No. 269,463

12 Claims. (Cl. 310—268)

This invention relates to dynamo electric machines and more particularly to electric motors and generators of the axial airgap types.

In my United States Patent #2,179,589 I described the principle of axial air gap motors and generators, also a simple way to construct such machines. In this present application improvements in details of such construction are described and claimed. Inasmuch as the fundamental principles used are given in my above mentioned U. S. patent, I will not describe them here. However, for complete understanding of operation of the machines shown in the following, it is necessary to refer to that U. S. patent.

The purposes of this invention are also similar to those described in that U. S. patent, but in addition I now provide simple and efficient methods to construct components of axial airgap motors and generators.

My present description refers to three items of construction as follows: (1) Construction of short circuited rotors and stators, (2) construction of wound rotors and stators, and (3) general construction of a motor or generator using the above rotors and stators.

An object of my invention is to provide an improved rotor and stator combination wherein a multiplicity of laminated cores have the direction of highest magnetic permeability parallel to the axis of rotation, and wherein the said cores are arranged in sets for close association with the coils and for efficient interaction between the rotor and stator cores.

Another object of my invention is to provide novel laminated end magnetic rings on the stator to give a return magnetic path of low reluctance.

A further object of my invention is to provide an improved rotor construction in the form of a wheel with spokes between which the laminated magnetic material is placed, and novel rim and hub construction to hold a multiplicity of rotor sections together.

A further object of this invention is to provide a stator or rotor construction with laminated magnetic cores held in a plastic materail with bar members surrounded by the said plastic material. One set of bar members is secured to the rim and another set is secured to a hub to give a rigid construction and provide heat dissipation paths.

A further object of this invention is to provide heat dissipation construction which includes conduction by air currents through a hollow hub with holes, and a ribbed outer rim member.

Another detailed object of this invention is to provide rigid construction adapted for ease of assembly which includes spoke portions and tabs on the rotors disposed parallel to the said magnetic laminations of the cores and perpendicular to the axis of rotation of the rotor with rims secured thereto.

A still further object of my invention is to simplify the assembly of wound rotors by providing a plug and receptacle construction for the connection of the coils on said rotors.

Figure 4:
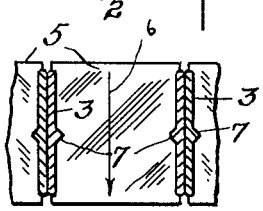
Figure 5:
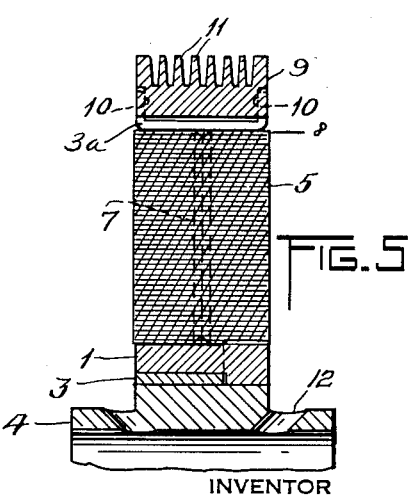
Figure 11:
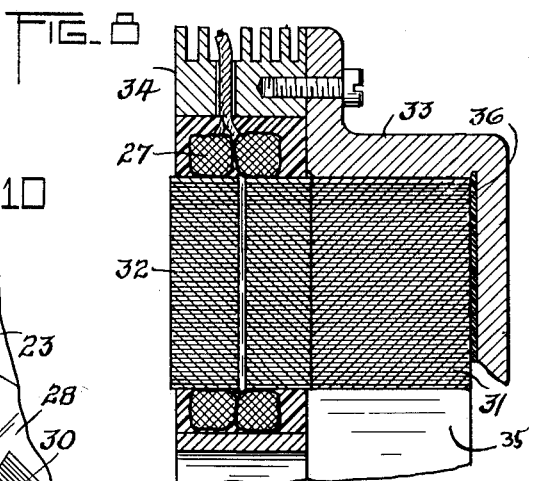
Figure 12:
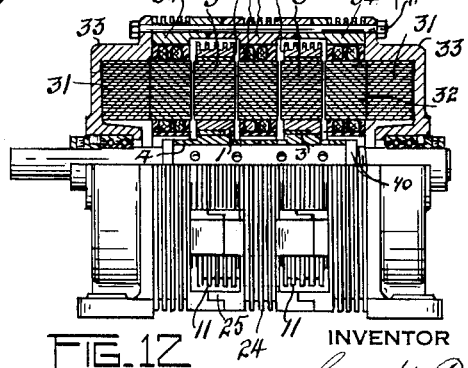
Figure 13:
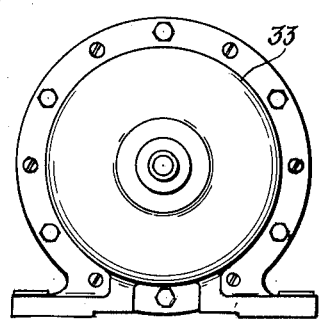

The above and other objects and features of novelty which I believe to be characteristic of my invention are set forth in the specification and with particularity in the appended claims. My invention itself, however, both as to its fundamental principles and as to its particular embodiments will best be understood by reference to the specification and accompanying drawings in which Fig. 1 and Fig. 2 shows the various steps in the construction of short circuited rotors, Fig. 3, Fig. 4 and Fig. 5 illustrate the appearance of the completed rotor in various views, Figures 6, 6a, 7 and 8 show constructional details of wound stators made according to my invention, Figures 9 and 10 illustrate various views of the completed stator, Fig. 11 is the cross sectional view of the end stator, Fig. 12 is the cross section of a completed motor using the invention, while Fig. 13 is the end view, and Fig. 14 is the end view of a wound rotor made according to the invention and Fig. 15 is the cross sectional view of the same.

Fig. 15 also shows in cross-section a broken portion of the hollow shaft supporting the several rotor sections.

Figure 2:
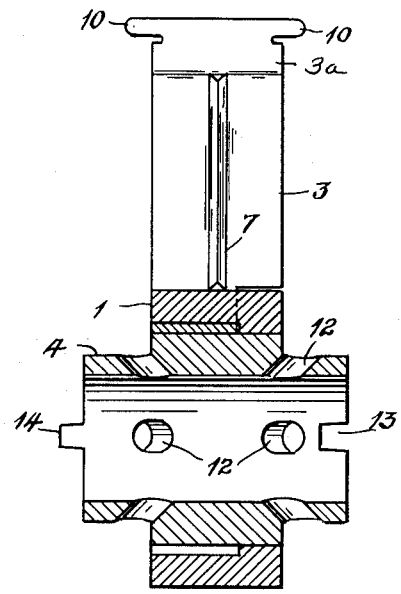
Figure 3:
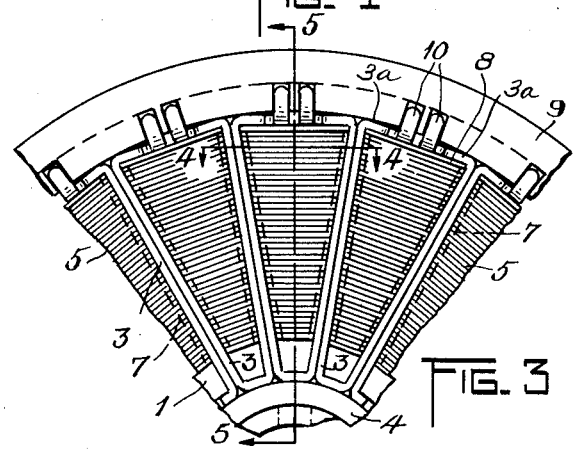

Referring now to item (1), the construction of short circuited rotors and stators, Figures 1 and 2 are the illustration of such construction. On Fig. 1 hub 1 is a non-magnetic material, such as copper alloy with equally spaced slots 2 cut in it radially. These cuts go in to the depth of about ¾ of the full length of the hub as shown on Fig. 2. After this, U-shaped conductor ribbons 3 are placed into these slots. Sleeve 4 is pushed into the space inside the hub and the entire construction is brazed or otherwise welded together with welding material, which flows into the small spaces between the sleeve 4, conductors 3 and hub 1. The V-shaped space between conductors 3 is then filled with a stack of laminated magnetic material such as is now available on the market under the name of "Hypersil." In order to facilitate this part of the construction, the silicon steel ribbon material, which is rolled in the length of the ribbon, is processed in a punch press die as follows. Pieces of the shape shown on Fig. 4 are punched with a die which can be adjusted to supply varying widths of pieces. These pieces are then made to fall on one another, to form a stack. Sometime during this operation, a cementing compound, such as for example sodium silicate is applied to the punched pieces so that when they form a stack, they stick together. The finished block or core is then pressed together in a form, to remove excess cement and permitted to dry. After drying a solid group is formed as shown at 5 on Fig. 1. The direction of rolling of the Hypersil ribbon is indicated by arrow 6 on Fig. 4.

The laminated blocks 5 are placed in the spaces between conductors 3 as shown on Fig. 1. In order to form a solid rotor, however, they are pressed with considerable pressure and in such manner, that they cut slightly into prisms 7, as well as bend a small amount at the point of contact with these prisms. All the blocks of one rotor are pressed into place at the same time in a suitable die. After pressing, the outer ends 3a of conductors 3 are bent, preferably in the same die, over the top of the blocks 5. In order to prevent the block of thin laminations from bending, a heavier lamination, or locking piece 8 is placed on the top of the block. The bent ends 3a of conductors 3 hold the block solid, but in addition a rim 9 is placed on top of the bent portions. In order to fit this rim 9 accurately, the ends 3a of conductors 3 may be turned down slightly on a lathe after they are bent in place. Following this, the perimeter of the disc is tinned with solder or any other similarly suitable material. Rim 9 is turned down on the inside to fit accurately over the disc, and is also tinned where it touches the disc. In this way a large area is used for making a low resistance contact, After this the rim is placed over the disc to occupy the position shown on Figures 3 and 5. To facilitate this operation, the disc may be cooled to a low temperature and the rim heated. The complete rotor so assembled is again placed in a die where tabs 10 are tightly folded over into suitable grooves cut into rim 9. This rim 9 also carries cooling rings 11. As a last operation the entire rotor is heated slightly above the melting point of the solder and additional solder is applied to fill in all the small spaces between the bent ends 3a of conductors 3 and tabs 9, the outer end of blocks 5 and rim 9. Hypersil must not be heated to the temperature where the grain structure of the metal is disturbed, but the use of low or medium high melting point solder is safe.

Sleeve 4 is brazed or welded into place; this operation is performed before inserting the Hypersil. This sleeve 4 serves the purpose of keeping an accurate space between rotors, as well as supporting the rotor solidly on the shaft 52 (Fig. 15). It has projection 14 and indentation 13 on its edge to fit into similar parts on other rotors. The stack of rotors on the shaft is then compressed by a shoulder near one end of the shaft and a nut on the other end, as shown in Fig. 12. In order to cool both rotors and stators, the shaft has a comparatively large diameter and is hollow inside. Air is drawn in on the ends of the shaft and passed thru suitable holes 53 (Fig. 15) on its periphery. These holes are in register with holes 12 on sleeve 4. For convenience the hollow shaft is omitted from Fig. 5 and is shown in Fig. 15. Laminated blocks or cores 5 project slightly on the surface of the rotor as shown on Fig. 5, leaving a small radial space between blocks, which facilitate the passage of the air between rotors and stators. Due to the natural blower action of the rotors, there is a strong current of air in these air gaps.

While the above description refers to the construction of rotors, the same is also applicable to shorted stators, except that sleeve 4 is then eliminated and suitable spacers are placed on rim 9. These spacers are discussed in connection with stator construction.

A very different construction is required for stators or rotors on which coils are used instead of shorted conductors. In the following the details of a stator construction with coils will be described, it being understood however, that the same fundamental construction is also applicable to wound rotors.

Figure 6:
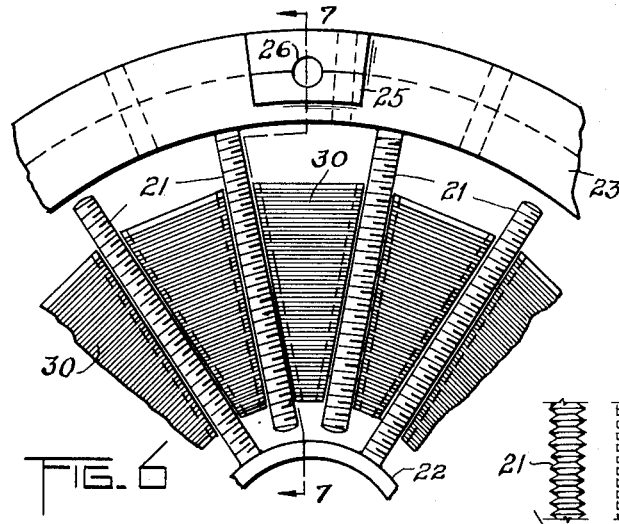
Figure 7:
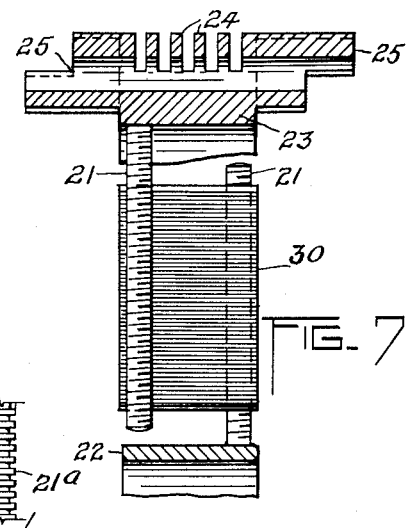
Figures 8, 10:
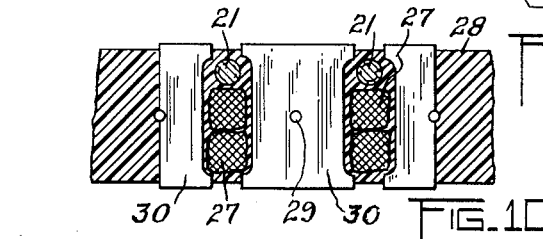
Figure 9:
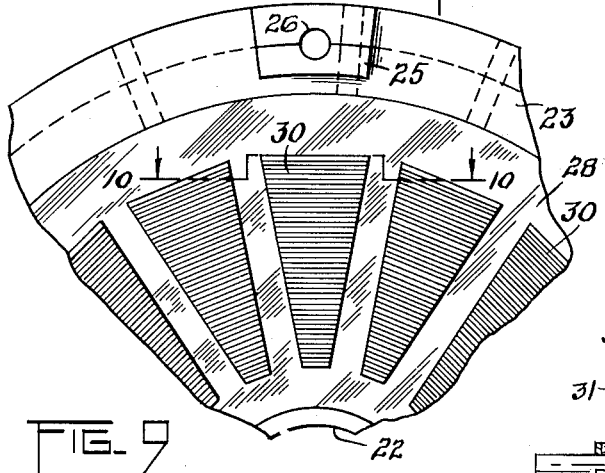

This construction, which is illustrated on Figures 6, 7 and 8, uses a plastic material to hold all the elements of the stator in their proper place. These elements are (1) the laminated blocks of Hypersil, similar to the ones used in the previously described rotors, (2) coils placed on these blocks, (3) a hub with reinforcing bars, and (4) a rim with reinforcing bars and mounting parts. In order to simplify the showing of these parts, on Fig. 6 only the hub 22 the rim 23 and the laminated blocks 30 are illustrated. The purpose of the hub and rim is primarily to serve as support for the plastic material which is contained between the two of them and secondarily conduct away the considerable amount of heat generated in operation. To accomplish this, ribbed bars or threaded rods 21 are mounted to both hub 22 and rim 23. All these parts 21, 22, and 23 are made of a good heat conducting and preferably non magnetic material, such as a copper or aluminum alloy. Rods 21 shown in more detail on Fig. 8 may be screwed or welded into their supporting rim or hub, in such manner as to form a good heat conducting connection as well as a strong mechanical bond. The relative position of these parts after assembly is as shown on Figures 6 and 7. The laminated cores of magnetic material are only indicated at 30. These cores or blocks have a small enough width to fit easily between the ribbed bars, but their surfaces are wider so as to overlap the bars. This is illustrated on Fig. 10. Rim 23 has cooling ribs 24 on its outer surface and it also has spacers 25. The purpose of these spacers 25 is to keep the stators properly spaced and supported after final assembly. Hole 26 passes thru these spacers and after assembly a long screw thru this hole presses the entire set of stators together as shown on Fig. 12. Of course there are several of these screws around the periphery of rim 23. These same screws may be used to hold the end bells which support the bearings and mounting feet.

The reinforcing bars are ribbed in order to hold better in the plastic and present a larger area to the heat conducting plastic medium and so to take on more heat. These bars may be made conical so that the free end may be small while the point of contact to the rim or hub may be of large cross-sectional area.

Hub 22 has a great enough inside diameter to permit any of the rotating parts on the shafts, such as sleeve 4 (Fig. 2) to fit inside it without touching. Fig. 9 shows the appearance of the stator after assembly. Laminated Hypersil blocks 30 are surrounded with coils and imbedded into plastic 28. These laminated blocks may be reinforced with pins 29 in order to hold the laminations rigidly together as shown on Fig. 10. The end laminations may be made heavier than the rest of the block. The coils or their connections are not detailed on the figures, inasmuch as the invention is applicable to any of the conventionally used winding systems and they do not form part of this invention. Some simple forms of coils are shown in my above mentioned U. S. patent. However, for polyphase work the coils have to be partly superimposed on one another, as is well known, and this makes it necessary to use narrow pole pieces, several of which make up one pole. An indication of how the coils may lay in the slots allotted for them is given on Fig. 10 and Fig. 11 where cross-sections of coils 27 are shown. Sharing the slots with these coils are ribbed rods 21. It was found practical to have some of these rods carry the heat to the hub, others to the rim as shown.

When constructing this stator, the laminated blocks are made with a variable width die as was described in connection with rotor construction, after which they are cemented, pressed and pinned together. These solid blocks are then placed in a mold where the rim is already in position. Suitable indentations hold the blocks in place in the mold and the system of coils is put in. These coils may be connected together inside the rim and the connections suitably insulated, or holes may be drilled on the rim and connections brought out to the outside of the rim. After the coils are in place, the hub with its ribbed rods is put into place. Since the space between the outer edges of the laminated blocks is narrower than these rods, it is necessary to move these blocks slightly during this operation. The coils and blocks do not fit the place tightly, since it is desirable to have the plastic flow in between the parts. Any one of several different plastics may be used, provided it is physically strong enough and able to stand the high temperature of the coils. This temperature can reach 250° F. and the insulation on the wire as well as all other parts must be chosen to work at this temperature. Glass or ceramic insulated wire answers this purpose and fiberglass ribbon is suitable for covering the coils. A simple liquid thermosetting phenol-formaldehyde resin known as the "Durez 7421A" was found to answer the requirements of a stator such as was described, however, other plastics, stronger physically, would be better for wound rotors. Since new plastic substances are invented from time to time, I do not want to limit the invention to any presently known substance.

The construction of end stators is shown on Fig. 11. While the now conventional stator construction used in axial air gap motors presently on the market will work, I prefer to use the same kind of stator as was described in the foregoing, but with the addition of a laminated ring 31 on the outside, as shown on Fig. 11. One surface of the ring 31 is ground smooth (as well as the corresponding pole pieces 32) so as to make a good magnetic bond. While it is preferable that the laminations in pole piece 32 be so oriented that the direction of rolling be parallel to the axis of rotation of the motor, such preference is waived in connection with the ribbon making up ring 31. However, a slight advantage can still be taken of the unusual magnetic properties of Hypersil, if the ring is made of material, the grain orientation of which is in length of the ribbon, that is in right angles to the axis of rotation. The radial width of the ring should be equal to the radial length of the block 32 in register with it while the length of the ring 31 (in other words its dimension parallel to the axis) should be such as to give approximately half the cross-section area of one pole, it being understood, that several laminated blocks make up one magnetic pole. End bells 33 mount the ring 31 to the stator. These brackets are mounted to rim 34. If desired these brackets may form part of the end bells and support the bearings. In any case the space 35 inside the ring is a desirable location for bearings. In this way these bearings do not increase the length of the machine. It may be stated here, that the outer surface of the ring 31 is usually so rough that it is difficult to use any accurate bracket on it. Therefore some soft material, such as silicon rubber or asbestos may be placed between the bracket 33 and ring 31. This material is indicated at 36.

Referring further to the bearings shown in Fig. 11, it will be noted that they are relieved of axial thrust by virtue of the symmetry of arrangement of the rotor and stator sections. Each rotor section is flanked by two stator sections, and the pulls exerted by magnetic action on the two ends of each rotor section are equal and opposite. It is an inherent property of this arrangement that all axial magnetic forces are balanced out so that the entire rotor assembly floats freely except for its weight, and the force applied to the bearings is that due to the weight. This is an advantage over the prior art in axial air gap machines, wherein the bearings are required to withstand a heavy end thrust resulting from magnetic forces.

On Fig. 12 the cross-section of the mechanical and magnetic parts of a motor are shown, built according to the above described principles. As illustrated, all the magnetic blocks and end rings are in register, the rotors are spaced by sleeves and held by pressure between the ends of the shaft, while the stators are similarly spaced by spacers near the periphery and held by screws that pull the end bells together. The shaft is hollow and is of large diameter. Air for cooling is drawn in on both ends of the shaft and is ejected at the periphery. The end view of the motor is illustrated on Figure 13.

In assembling this motor, the stator and rotor discs are placed alternately on the shaft and nut 40 near the end of the shaft is used for pulling and tightening the rotors together, after it is made certain that the air holes on the shaft are in register with those on the rotors. Following this operation, the long bolts 41 are put in place and the set of stators pulled together with them, placing all parts of the motor in their proper relative positions.

All previous descriptions of short circuited and wound construction of discs are applicable to both rotors and stators. To simplify the explanation the short circuited construction was described in connection with rotors while the wound construction was shown applied to stators. To illustrate the interchangeability of construction, the details of a wound rotor are illustrated on Figures 14 and 15. In most respects this rotor is similar to the stator shown on Fig. 9 and all part numbers are retained from that figure with the letter "*a*" added. The main difference is in the mounting means. While the stator on Fig. 9 has projections 25 on its outer rim to hold it in position, the rotor on Figures 14 and 15 uses hub 4*a* to mount it to the shaft in a similar manner as the short circuited rotor on Figures 1 to 5.

An additional difference is in the means used for making electrical connections to the coils. Fig. 11 shows a hole through rim 34 of a stator where the coil wires are pulled to the outside for purposes of connection. On Figures 14 and 15 there is a sleeve 51 shown imbedded in insulating material 50 to which coil 27*a* is connected. It is of course understood that if the coil system requires more than one connection on each side of the disc, a greater number of sleeves may be used. Usually however, the rotor coils are energized by direct current, while one or more phases of alternating currents are used in the stator coils. In such cases one connecting device on each side of the disc rotor is sufficient. While on the side shown on Fig. 14 there is a sleeve, it is understood that the other side may have a plug. Each rotor is similarly equipped, so that when assembling the rotors, these sleeves and plugs are plugged together and all coils are connected in series thereby. Of course the end rotors plug into suitable slip rings. These slip rings get their current from brushes in the conventional manner. No slip rings or brushes are shown however, inasmuch as these are well established in the art and no novelties are claimed in them.

While I have shown and described certain preferred embodiments of my invention, it will be understood that modifications and changes may be made without departing from the spirit and scope thereof, as will be clear to those skilled in the art.

In this application I have particularly pointed out and distinctly claimed the part, improvement or combination which I claim as my invention or discovery, and I have explained the principles thereof and the best mode in which I have contemplated applying those principles, so as to distinguish my invention from other inventions.

I claim:

1. An electric motor comprising a rotor with a wheel which includes non-magnetic electric conductor material and having a hub and radially disposed spokes, a rim of non-magnetic material on the wheel secured to the said spokes, laminated cores in the space between the spokes of high permeability magnetic material with the direction of the highest permeability parallel to the axis of rotation of the rotor, a stator which includes a hub and rim, laminated cores in the space between the hub and rim of high permeability magnetic material with the direction of highest permeability parallel to the axis of the rotor, electrically conductive material around the said cores of the stator, an outside end member of the stator including a laminated magnetic member whose direction of highest magnetic permeability is substantially perpendicular to the axis of rotation of the said rotor; the laminations of said outside end member being in close magnetic contact with the laminations of the stator.

2. An electric motor comprising a rotor which includes a multiplicity of separate rotor sets of non-magnetic electrical conducting material having a hub and radially disposed spokes, a rim of non-magnetic conductive material for each rotor set secured to the spokes of the corresponding rotor set, laminated cores in the space between the spokes of high permeability magnetic material with the direction of highest permeability parallel to the axis of rotation of the rotor, a stator consisting of a multiplicity of separate stator sets of hubs and rims with magnetic laminated cores in the space between the hubs and rims and with the direction of highest permeability parallel to the axis of rotation of the rotor, electrically conductive coils around said cores of the stator, the laminated magnetic cores in each of the separate rotor sets of hubs and spokes being adapted to rotate adjacent to and between corresponding laminated magnetic cores in corresponding hubs and rims of the stator sets, wherein said hubs and rims of the stator are made of heat conducting material, two sets of bar members also made of heat conducting material for each pair of hub and rim, one set of the said bar members being secured to the hub and the other set being secured to the rim, the said laminated cores being disposed between the bar members, and plastic material surrounding the bar members adapted to hold the said laminated cores and the said associated coils.

3. In a dynamo-electric machine, a plurality of rotor sections each having a hollow hub, a common hollow sleeve passing through said hubs and adapted to pass air currents for cooling in a direction parallel to the axis of rotation, apertures piercing the hubs and apertures piercing the hollow sleeve, said apertures in the hollow sleeve registering with said apertures in the hubs to provide passageways for the said air currents in a substantially radial direction.

4. In a dynamo-electric machine, a rotor section comprising a hollow hub with slots extending radially therethrough, a shaft member within the hub, and electrically conductive spokes passing through the slots, portions of the spokes extending between said shaft member and the interior of the hub and being clamped hereby.

5. In a dynamo-electric machine, a stator section comprising a plurality of cores having a common plane surface, said cores being made of laminated magnetic material with the direction of highest permeability perpendicular to said plane surface, and an end member of magnetic material in magnetic contact with said cores, said end member being made of laminated magnetic material with the direction of highest permeability parallel to said plane surface.

6. A magnetic structure comprising a supporting member, a set of bar members secured to said supporting member, a core of magnetic material, and supporting material flowed into interlocking relationship with both the bar members and the core and solidified to fix their relative position.

7. A magnetic structure comprising a hub, a rim, a core of magnetic material in the space between the hub and the rim, a set of bar members secured to the hub, another set of bar members secured to the rim, and plastic material surrounding the bar members adapted to hold the core.

8. A magnetic structure comprising a hub, a rim, a core of magnetic material in the space between the hub and the rim, an electrically conductive coil around said core, a set of bar members secured to the hub, another set of bar members secured to the rim, and plastic material surrounding the bar members adapted to hold the core and the coil; said hub, rim and bar members being made of heat conducting material and said bar members being ribbed to facilitate the transfer of heat and strengthen the bond between the bar members and the plastic.

9. In a dynamo-electric machine, a stator section comprising a plurality of cores of magnetic material having a common plane surface, an end member of magnetic material having a plane surface, an end bell adapted to press said end member into magnetic contact with said cores, and compressible material between said end member and the end bell to fill irregular spaces between them.

10. An induction motor rotor comprising a wheel of non-magnetic electrically conductive material having a hub and spokes, said spokes having portions extending radially outward and outer portions, a separate rim also made of non-magnetic electrically conductive material, a laminated core made of magnetic material in the space between the spokes, the outer portions of the spokes being interposed between said rim and the laminations of the said core and separating said rim from said laminations, said outer portions of the spokes securing the laminations in position and being in turn secured in position by said rim.

11. An induction motor according to claim 10 wherein said outer portions of the spokes further include tabs extending radially outward, said tabs engaging said rim to limit its movement in a direction parallel to the axis of the rotor, thereby securing the rim to said outer portions of the spokes.

12. An induction motor rotor according to claim 10 wherein said outer portions of the spokes further include tabs extending radially outward, and indentations on the rim into which said tabs are fitted, whereby the rim is locked against rotational movement relative to the spokes.

References Cited in the file of this patent

UNITED STATES PATENTS

| Number | Name | Date |
|---|---|---|
| 288,051 | Giles | Nov. 6, 1883 |
| 382,174 | Mackie | May 1, 1888 |
| 1,275,665 | Eichbaum | Aug. 13, 1918 |
| 1,449,371 | Apple | Mar. 27, 1923 |
| 1,566,693 | Pletscher | Dec. 22, 1925 |
| 1,605,796 | Tanzler | Nov. 2, 1926 |
| 1,769,281 | Zubaty | July 1, 1930 |
| 1,819,228 | Coates | Aug. 18, 1931 |
| 1,883,288 | Zubaty | Oct. 18, 1932 |
| 1,946,957 | Allen | Feb. 13, 1934 |
| 2,006,172 | Klappauf | June 25, 1935 |
| 2,031,967 | Mathias | Feb. 25, 1936 |
| 2,057,503 | Sawyer | Oct. 13, 1936 |
| 2,098,958 | Ekstromer | Nov. 16, 1937 |
| 2,121,851 | Barrett | June 28, 1938 |
| 2,345,850 | Winther | Apr. 4, 1944 |
| 2,438,629 | Anderson | Mar. 30, 1948 |
| 2,479,589 | Parker | Aug. 23, 1949 |
| 2,488,961 | Camilli | Nov. 22, 1949 |
| 2,495,218 | Aske | Jan. 24, 1950 |
| 2,519,554 | Felici | Aug. 22, 1950 |
| 2,550,571 | Litman | Apr. 24, 1951 |

FOREIGN PATENTS

| Number | Country | Date |
|---|---|---|
| 509,726 | Great Britain | July 20, 1939 |